(12) United States Patent
Riach et al.

(10) Patent No.: US 8,154,556 B1
(45) Date of Patent: Apr. 10, 2012

(54) MULTIPLE SIMULTANEOUS UNIQUE OUTPUTS FROM A SINGLE DISPLAY PIPELINE

(75) Inventors: Duncan A. Riach, Mountain View, CA (US); Michael A. Ogrinc, San Francisco, CA (US); Brijesh Tripathi, Santa Clara, CA (US); Wayne D. Young, Thatcham (GB)

(73) Assignee: NVIDIA Corporation, Santa Clara, CA (US)

( * ) Notice: Subject to any disclaimer, the term of this patent is extended or adjusted under 35 U.S.C. 154(b) by 1150 days.

(21) Appl. No.: 11/955,307

(22) Filed: Dec. 12, 2007

Related U.S. Application Data

(63) Continuation-in-part of application No. 11/936,073, filed on Nov. 6, 2007.

(51) Int. Cl.
*G09G 5/399* (2006.01)
(52) U.S. Cl. ......... 345/540; 345/536; 345/537; 345/541
(58) Field of Classification Search .................. None
See application file for complete search history.

(56) References Cited

U.S. PATENT DOCUMENTS

| | | | | |
|---|---|---|---|---|
| 5,241,372 A | * | 8/1993 | Ohba | 348/578 |
| 6,931,660 B1 | | 8/2005 | Kalluri et al. | |
| 2006/0117360 A1 | | 6/2006 | Cooper et al. | |
| 2006/0290641 A1 | * | 12/2006 | Ku et al. | 345/98 |

OTHER PUBLICATIONS

Office Action, U.S. Appl. No. 11/936,073, dated Sep. 27, 2010.

* cited by examiner

*Primary Examiner* — Kee M Tung
*Assistant Examiner* — Jwalant Amin
(74) *Attorney, Agent, or Firm* — Patterson & Sheridan, LLP

(57) ABSTRACT

One embodiment of the present invention sets forth a system for generating multiple video output signals from a single video pipeline within a graphics processing unit. Pixel data from more than one display surface is retrieved and multiplexed before being transmitted to a video pipeline for processing. The resulting video pixel data is routed to video output encoders, which selectively accept the video pixel data for transmission to attached display devices.

14 Claims, 7 Drawing Sheets

MULTIPLE SIMULTANEOUS UNIQUE OUTPUTS FROM A SINGLE DISPLAY PIPELINE

CROSS REFERENCE TO RELATED APPLICATION

The current application is a continuation-in-part of the U.S. patent application titled, "Multiple Simultaneous Unique Outputs From A Single Display Pipeline," filed on Nov. 6, 2007 and having patent application Ser. No. 11/936,073 (NVDA/P002042). This related application is incorporated herein by reference in its entirety.

BACKGROUND OF THE INVENTION

1. Field of the Invention

Embodiments of the present invention relate generally to graphics system architectures and more specifically to generating multiple simultaneous unique outputs from a single display pipeline.

2. Description of the Related Art

A typical computer system includes, without limitation, a central processing unit (CPU), a graphics processing unit (GPU), at least one display device, and one or more input devices, such as a keyboard and a mouse. The display device generates a sequence of images from sequential video frames, each composed from a structured stream of pixels. The stream of pixels is typically generated by a video pipeline within the GPU. The video pipeline performs pixel processing operations, known to persons skilled in the art, which enable proper display of video images. For example, the video pipeline may perform "gamma correction" on a pixel in order to properly account for certain non-linear characteristics of an attached display device. A display device is frequently called a "head." Consequently, the circuitry within the GPU used to support the display device is also referred to as a "head."

When a user attaches one or more additional display devices to the computer system to view independent images, additional video pipelines are needed to generate the independent images. Modern GPU devices typically include two independent video pipelines, allowing the user to attach one or two display devices to the GPU. Each GPU also commonly includes numerous digital and analog video output ports used to support various video standards. However, despite the availability of these video output ports included in the GPU device, the GPU is still limited to driving two display devices (or the number of display devices equal to the number of available independent video pipelines within the GPU).

One approach to increasing the overall number of display devices that may be attached to a computer system is to configure the computer system to include additional GPUs. These additional GPUs provide additional video pipelines that can drive the independent display devices. One popular computer system configuration includes four similar or identical display devices. This configuration requires that two GPUs be present within the computer system, where each GPU includes two video pipelines. While many applications that require four display devices do not require the additional graphics processing capability of an additional GPU, the second GPU is nonetheless required in order to provide the necessary video pipelines used to drive the additional display devices. The second GPU increases the cost of the computer system and increases the amount of power needed to operate the computer system.

Another approach to increasing the number of display devices that may be attached to a computer system is to include additional independent video pipelines within the GPU, thereby allowing the GPU to drive additional independent display devices. However, the circuitry needed to implement a video pipeline is expensive and would add to the overall cost of the GPU, which should be optimized for the common usage case of driving one or two display devices.

As the foregoing illustrates, what is needed in the art is a GPU architecture that accommodates additional display devices without the expense of including additional display pipelines within the GPU.

SUMMARY OF THE INVENTION

One embodiment of the present invention sets forth a horizontal scaling filter included in a video pipeline configured to process video data. The horizontal scaling filter includes a first set of storage elements, where each storage element is configured to receive pixel data in a first clock cycle and to transmit the pixel data in a second clock cycle to produce delayed pixel data, a plurality of multipliers configured to generate weighted pixel data from the delayed pixel data, and a summation unit configured to sum the weighted pixel data to produce output pixel data.

One advantage of the disclosed system is that, by interleaving pixels from different images, the interleaved pixels for multiple heads may be processed within the same video pipeline, thereby achieving greater overall efficiency within the host GPU. Further, the horizontal scaling filter within the video pipeline advantageously enables video processing operations to be performed on either non-interleaved or interleaved pixel data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
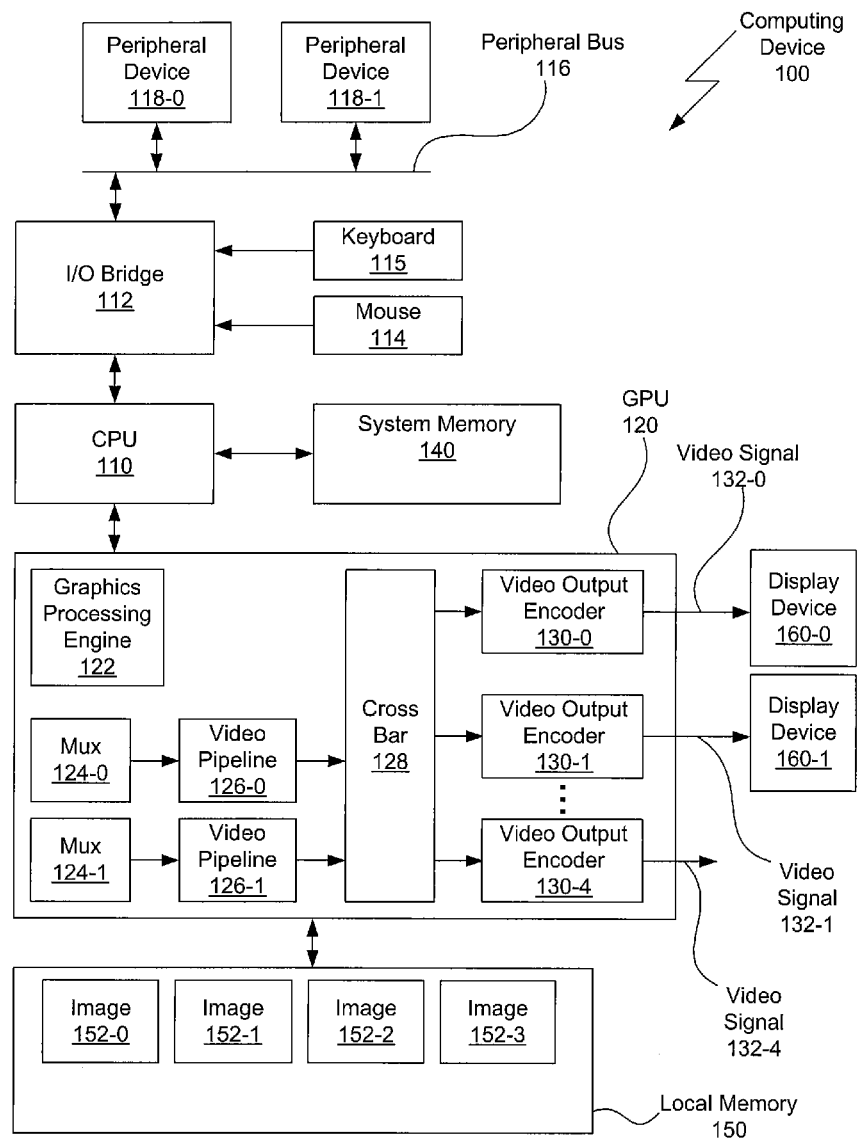
FIG. 1 depicts a computing device in which one or more aspects of the invention may be implemented.

FIG. 1 depicts a computing device 100 in which one or more aspects of the invention may be implemented. The computing device 100 includes a central processing unit (CPU) 110, system memory 140, an I/O bridge 112, a mouse 114, a keyboard 115, and peripheral devices 118 attached to the I/O bridge 112 via peripheral bus 116. The computing device 100 also includes a graphics processing unit (GPU) 120 with attached local memory 150 and attached display devices 160. In one embodiment, the GPU 120 and the CPU 110 are configured to share a common memory subsystem, such as the system memory 140.

The CPU 110 processes programming instructions stored within system memory 140 and coordinates the activities of the I/O bridge 112 and GPU 120. The I/O bridge 112 enables the CPU 110 to interface to peripheral devices 118 via the peripheral bus 116. Peripheral devices 118 may include, without limitation, a hard disk drive adapter and a network adapter. The peripheral bus 116 may be a Peripheral Component Interconnect (PCI) type bus or any other appropriate type of system bus. The I/O bridge 112 also receives input from the keyboard 115 and mouse 114 for processing by the CPU 110.

The CPU 110 directs the GPU 120 to generate images 152 and store the images in the local memory 150 for display on display devices 160. Each image 152-0 through 152-3 may be displayed on a corresponding display device. For example, image 152-0 may be displayed on display device 160-0 via the GPU 120.

The GPU 120 may include a graphics processing engine 122, video output encoders 130, a cross bar 128, video pipelines 126, and multiplexers 124. The graphics processing engine 122 may include a plurality of processing elements, such as fixed function and programmable processing cores.

The video output encoders 130 receive pixel data and timing data represented in digital form and generate a set of output signals 132 that conform to a selected video signal standard. For example, the video output encoder 130 may generate analog video signals consistent with the video graphics adapter (VGA) industry standard. Alternately, the video output encoder 130 may generate a set of serial high-speed digital bit streams consistent with the digital video interface (DVI) industry standard. A given video output encoder 130 is typically configured to produce only analog or only digital signals, therefore, a GPU 120 may include enough video output encoders 130 to accommodate the various industry standards for video signals. In one embodiment, the video output encoders 130 incorporate a de-multiplexer circuit (not shown) configured to select certain data presented to the video output encoder 130 for display, while discarding other data not intended for the given video output encoder 130.

The cross bar 128 routes data from video pipelines 126 to video encoders 130. For example, the cross bar 128 may be configured to route data from video pipeline 126-0 to video encoder 130-1 and data from video pipeline 126-1 to video encoder 130-0. Or the cross bar 128 may be configured to route the same data from video pipeline 126-0 to video output encoder 130-0 and also video output encoder 130-1. In this second scenario, pixel data for both video output encoder 130-0 and 130-1 are interleaved in the same data stream. The video output encoder 130-0 selects only data, referred to as "selected display data," that is intended for display on display device 160-0. The video output encoder 130-0 discards data intended for display device 160-1. Similarly, video output encoder 130-1 extracts selected display data intended for display on display device 160-1, while discarding data intended for display device 160-0.

The video pipelines 126 receive interleaved pixel data from multiplexers 124 and generate processed interleaved pixel data. For example, the video pipelines 126 may perform a gamma correction on the interleaved pixel data to account for non-linearity exhibited by the display devices 160. The processed interleaved pixel data is de-multiplexed by video output encoders 130 and used for display on the display devices 160. The multiplexers 124 receive pixel data from one or more images 152 stored within local memory 150 to generate the interleaved pixel data. The interleaved pixel data may include pixels for a single head, or interleaved pixels for multiple heads.

Figure 2:
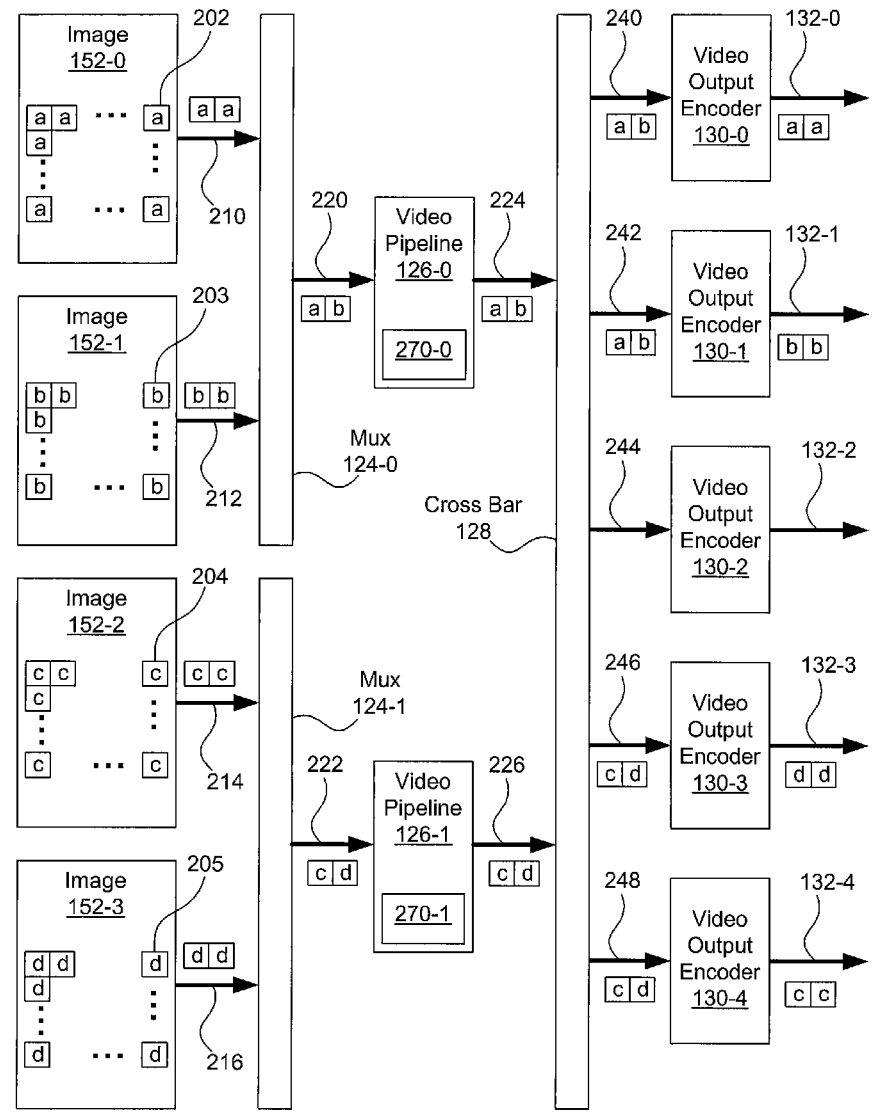
FIG. 2 illustrates a video pipeline configured to process pixels that are interleaved from two different source images, according to one embodiment of the invention.

FIG. 2 illustrates video pipelines 126 configured to process pixels that are interleaved from two different source images, according to one embodiment of the invention. Image 152-0 includes one or more pixels 202, marked "a." Image 152-1 includes one or more pixels 203, marked "b." The pixels 202 are transmitted as pixel data 210 to multiplexer 124-0. Similarly, the pixels 203 are transmitted as pixel data 212 to multiplexer 124-0. The multiplexer 124-0 interleaves the pixels 202, 203 to generate interleaved pixel data 220, which includes alternating pixels from image 152-0 and 152-1. The video pipeline 126-0 processes the pixels 202, 203 transmitted within the interleaved pixel data 220 using technically appropriate techniques, including techniques that may be well-known and substantially similar to non-interleaved processing, to generate processed interleaved pixel data 224.

The crossbar 128 replicates and routes the processed interleaved pixel data 224 to two or more video output encoders 130. For example, the processed interleaved pixel data 224 may be routed to video output encoder 130-0 (via data stream 240), as well as to video output encoder 130-1 (via data stream 242). In this scenario, pixels 202 are processed by video pipeline 126-0 and routed, along with pixels 203, to video output encoder 130-0. Video output encoder 130-0 selects only data related to pixels 202 to generate a video output signal 132-0. Similarly, pixels 203 are processed by video pipeline 126-0 and routed, along with pixels 202, to video output encoder 130-1. Video output encoder 130-1 selects only data related to pixels 203 to generate a video output signal 132-1.

In a similar way, pixels 204 from image 152-2 are processed by video pipeline 126-1 in order to generate video output signal 132-4 and pixels 205 from image 152-3 are processed by video pipeline 126-1 in order to generate video output signal 132-3.

By interleaving pixel data processed by the video pipelines 126, logical heads associated with a specific video pipeline 126-0 or 126-1 are available to drive multiple display devices. These logical heads are also referred to as "sub-heads." While the video pipelines 126 may perform a substantial portion of pixel processing without needing to know which pixel is associated with which sub-head, cursor logic 270 within the video pipelines 126 should be aware of which sub-head is associated with a given pixel being processed in order to properly generate a cursor for display on the appropriate sub-head. The cursor logic 270 may examine a tag associated with a pixel being processed by the video pipeline 126 to determine if the cursor should be visible on the target sub-head of the pixel. If the cursor should be visible on the target sub-head and the cursor intersects the pixel in screen space, then the cursor logic 270 may perform an overlay operation on the pixel being processed. If the cursor should not be visible on the target sub-head, then the cursor logic 270 does not perform an overlay operation on the pixel being processed.

Persons skilled in the art will recognize that there are many known techniques for tagging pixel data with sub-head information to properly inform the cursor logic 270 of an association between pixel data and a target sub-head.

Figure 3:
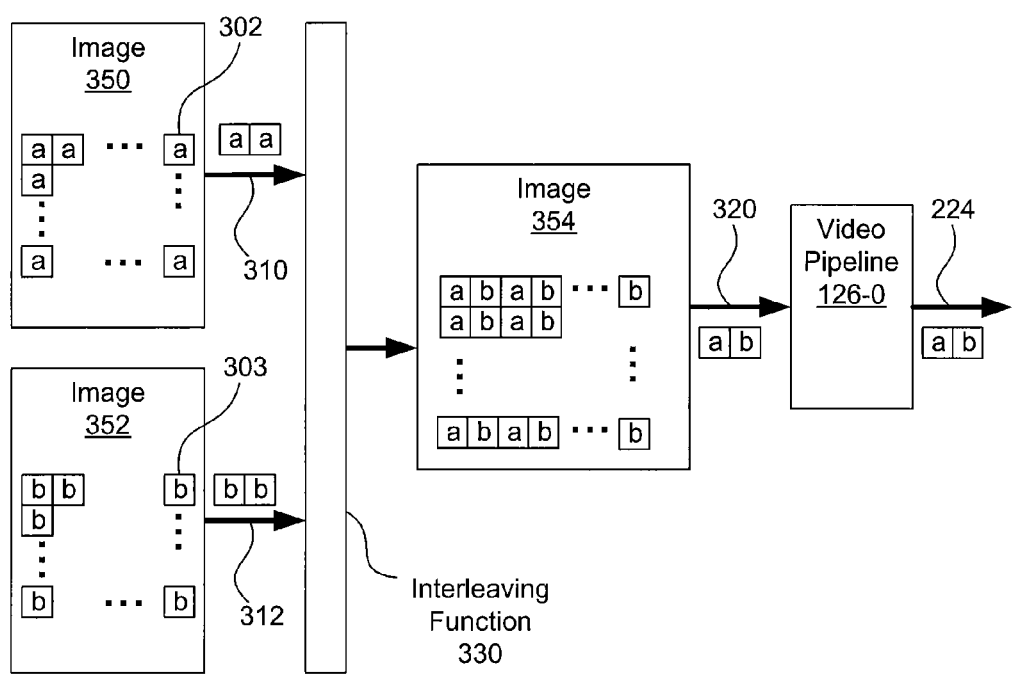
FIG. 3 illustrates a video pipeline configured to process pixels from a single source image that is spliced together from two different source images, according to one embodiment of the invention.

FIG. 3 illustrates a video pipeline 126-0 configured to process pixels from a single source image 354 that is spliced together from two different source images 350, 352, according to one embodiment of the invention. Each image 350, 352 corresponds to unique source images for display on independent display devices (not shown).

Image 350 includes pixels 302, which are transmitted to an interleaving function 330 as pixel data 310. Image 352 includes pixels 303, which are transmitted to an interleaving function 330 as pixel data 312. The interleaving function 330 generates the single source image 354 by alternating pixels from pixel data 310 and pixel data 312. The interleaving function 330 may be implemented using software, dedicated hardware, or any combination thereof.

Data within the single source image 354 is transmitted to the video pipeline 126-0 as interleaved pixel data 320, which includes pixels from each source image 350 and 352. The interleaved pixel data 320 is substantially identical in form to interleaved pixel data 220 of FIG. 2. Video pipeline 126-0 processes the data stream 320 and generates processed interleaved pixel data 224. The processed interleaved pixel data 224 is then routed and displayed according to the discussion in FIG. 2.

Figure 4:
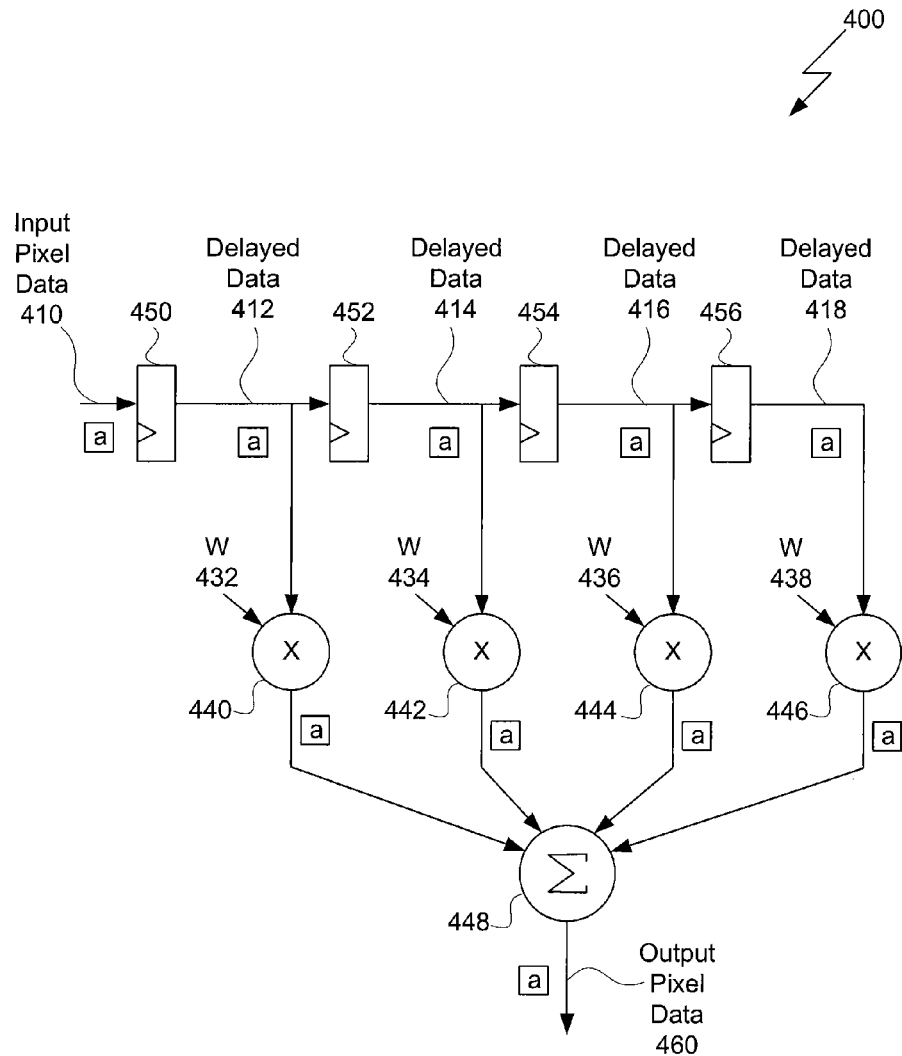
FIG. 4 illustrates a horizontal scaling filter configured to sample a first set of input pixels and generate a second set of output pixels.

FIG. 4 illustrates a horizontal scaling filter 400 configured to sample a first set of input pixels and generate a second set of output pixels. The horizontal scaling filter 400 includes storage elements 450, 452, 454 and 456, multipliers 440, 442, 444 and 446, and summation unit 448. The horizontal scaling filter 400 receives the first set of pixels as input pixel data 410 and generates the second set of pixels as output pixel data 460. Persons skilled in the art will recognize that the horizontal scaling filter 400 may operate independently from any vertical scaling operations and requires no modification to the conventional operation any vertical scaling logic.

Each storage element 450-456 may store one or more pixel attributes used for scaling. Such pixel attributes may include, for example, red, green and blue intensity values associated with a pixel. During normal operation, input pixel data 410 is captured by storage element 450 and stored as delayed data 412. Similarly, delayed data 412 is captured by storage element 452 and stored as delayed data 414, and so forth. Multiplier 440 receives delayed data 412 and an associated weight 432 and generates weighted pixel data, which is transmitted to the summation unit 448. Similarly, multipliers 442 through 446 generate weighted pixel data from delayed data 414 through 418 and weights 434 through 438. The weighted pixel data is transmitted to the summation unit 448, which adds the weighted pixel data to produce a weighted sum value over the weighted pixel data. The weighted sum value is transmitted from the horizontal scaling filter 400 as output pixel data 460. Pixel data at each location in the horizontal scaling filter 400 is marked "a," indicating the pixel data is associated with the same sub-head. Persons skilled in the art will recognize that there are many possible techniques for implementing the horizontal scaling filter 400 in the context of the video pipelines 126.

Figure 5A:
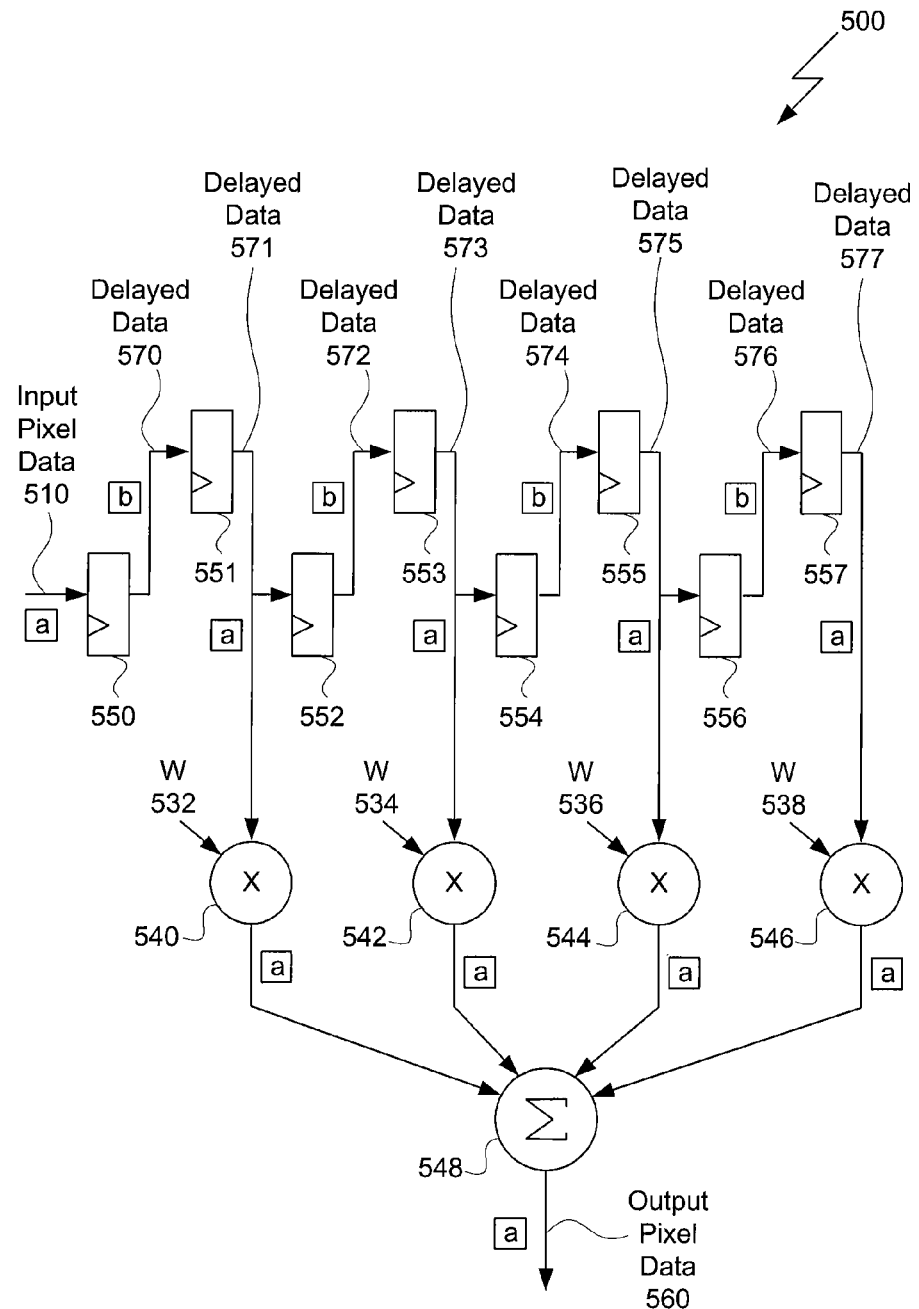
FIG. 5A illustrates a horizontal scaling filter configured to operate on two-way interleaved pixel data, according to one embodiment of the invention.

FIG. 5A illustrates a horizontal scaling filter 500 configured to operate on two-way interleaved pixel data, according to one embodiment of the invention. The two-way interleaved pixel data enters the horizontal scaling filter 500 as input pixel data 510. The two-way interleaved pixel data includes alternating pixels from each of two sub-heads. In one embodiment, the interleave pattern includes one pixel from the first sub-head, followed by one pixel from the second sub-head, followed then by one pixel from the first sub-head, and so forth. The association between pixel data within the horizontal scaling filter 500 and each of the two sub-heads is shown as an "a" marking to indicate association with the first sub-head and a "b" marking to indicate association with the second sub-head.

As each element of input pixel data 510 is received, storage elements 550, 552, 554, and 556 alternately store delayed data associated with the first sub-head and then the second sub-head. Similarly, storage elements 551, 553, 555, and 557 alternately store delayed data associated with the second sub-head and then the first sub-head. After a given clock cycle, the storage elements 550, 552, 554, and 556 either store data associated with the first sub-head or the second sub-head. Additionally, storage elements 550, 552, 554, and 556 transmit delayed data to storage elements 551, 553, 555, and 557. After a given clock cycle, the storage elements 551, 553, 555, and 557 either store data associated with the second sub-head or the first sub-head. Additionally, storage elements 551, 553, 555, and 557 transmit delayed data to multipliers 540 through 546 for processing.

In the clock cycle shown, storage elements 550, 552, 554, and 556 store delayed data 570, 572, 574, and 576, which is associated with the second sub-head (again, indicated with a marking of "b"). At the same time, storage elements 551, 553, 555, and 557 store delayed data 571, 573, 575, and 577, which is associated with the first sub-head (again, indicated with a marking of "a"). During the clock cycle shown, multipliers 540 through 546 receive delayed data 571, 573, 575 and 577, along with weights 532, 534, 536, and 538 and compute weighted pixel data associated with the first sub-head. In one embodiment data associated with the first sub-head is processed by multipliers 540 through 546 and summation unit 548 in the same clock cycle. In alternate embodiments, different pipelining schemes may be used with multipliers 540 through 546 and summation unit 548.

Figure 5B:
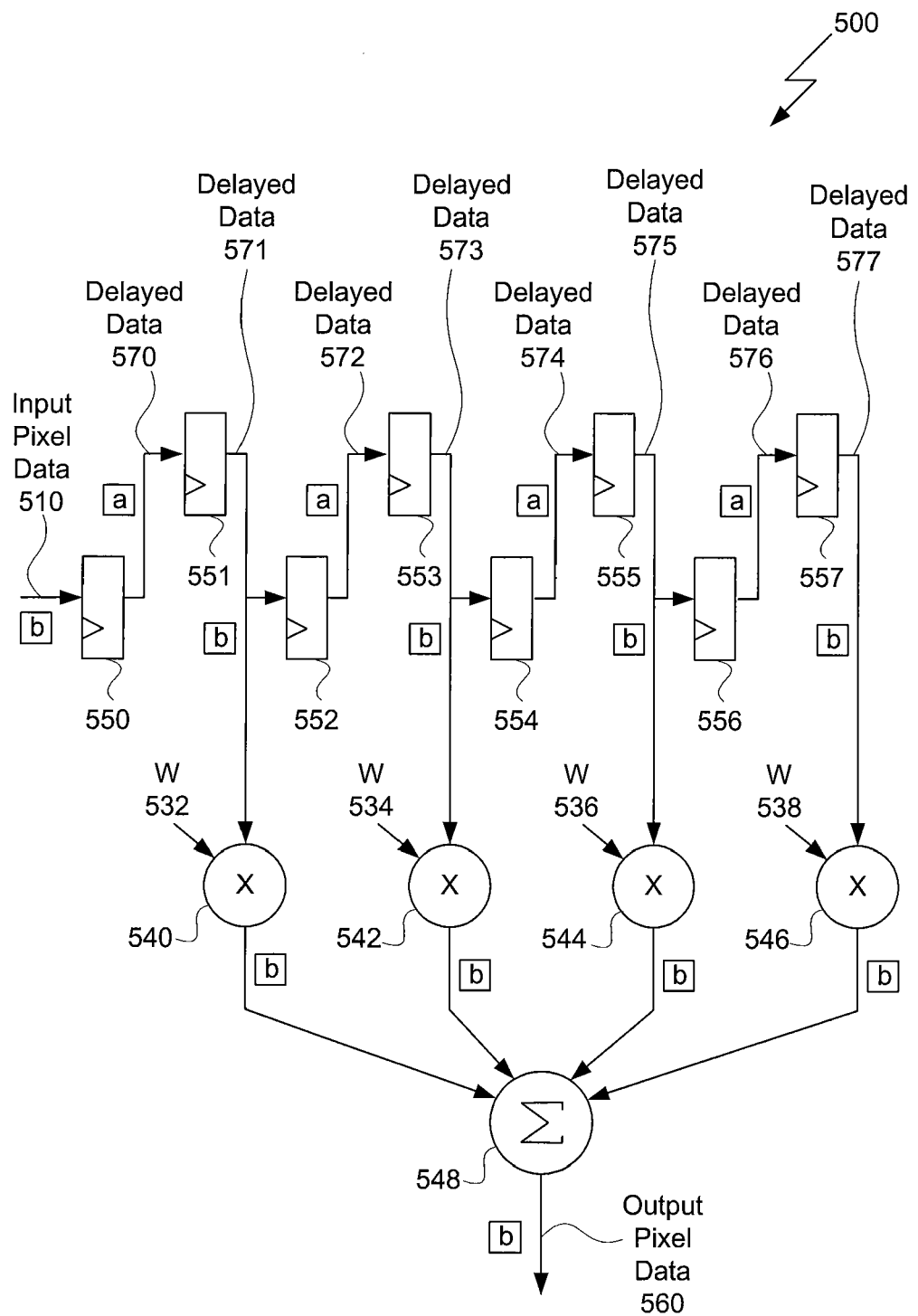
FIG. 5B illustrates a horizontal scaling filter configured to operate on two-way interleaved pixel data, according to one embodiment of the invention.

FIG. 5B illustrates a horizontal scaling filter 500 configured to operate on two-way interleaved pixel data, according to one embodiment of the invention. This figure illustrates the horizontal scaling filter 500 of FIG. 5A with state that is advanced by one clock cycle. In the clock cycle shown, storage elements 550, 552, 554, and 556 store delayed data 570, 572, 574, and 576, which is now associated with the first sub-head (again, indicated with a marking of "a"). At the same time, storage elements 551, 553, 555, and 557 store delayed data 571, 573, 575, and 577, which is now associated with the second sub-head (again, indicated with a marking of "b"). During this clock cycle, multipliers 540 through 546 receive delayed data 571, 573, 575 and 577, along with weights 532, 534, 536, and 538 and compute weighted pixel data associated with the second sub-head.

Figure 6:
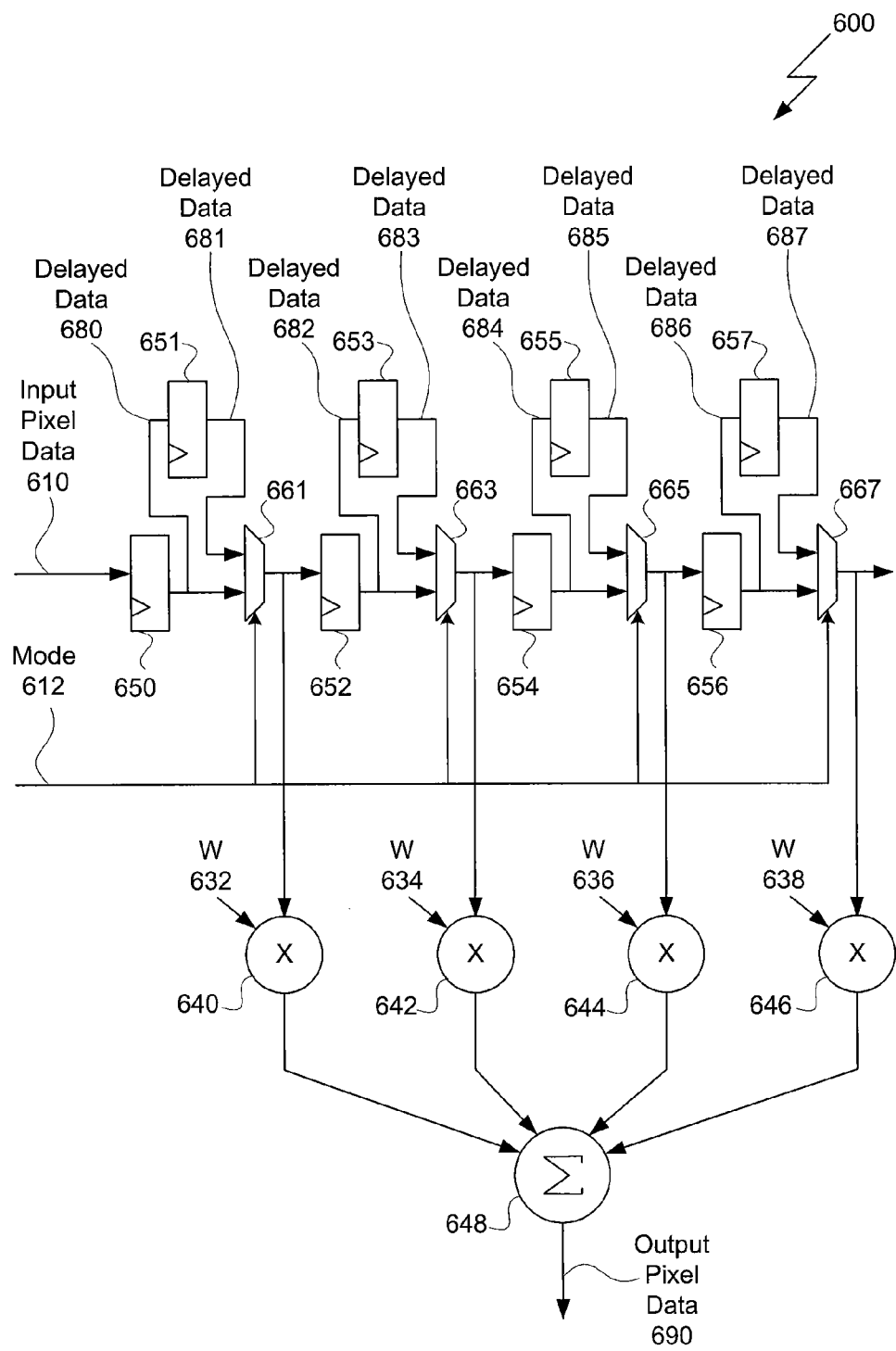
FIG. 6 illustrates a horizontal scaling filter configured to operate on either non-interleaved or interleaved pixel data, according to one embodiment of the invention.

FIG. 6 illustrates a horizontal scaling filter 600 configured to operate on either non-interleaved or interleaved pixel data, according to one embodiment of the invention. The horizontal scaling filter 600 includes storage elements 650, 652, 654, and 656, which store delayed data 680, 682, 684, and 686, respectively. The horizontal scaling filter 600 also includes storage elements 651, 653, 655, and 657, which store delayed data 681, 683, 685, and 687, respectively.

A mode signal 612 determines if the horizontal scaling filter 600 should operate in a non-interleaved mode or an interleaved mode by driving the select input of multiplexers 661, 663, 665, and 667. For example, to operate in non-interleaved mode, multiplexer 661 passes delayed data 680 from storage element 650 to storage element 652. Similarly, multiplexer 663 passes delayed data 682 from storage element 652 to storage element 654, and so forth. In interleaved mode, multiplexer 661 passes delayed data 681 from storage element 651 to storage element 652. Similarly, multiplexer 663 passes delayed data 683 from storage element 653 to storage element 654, and so forth. In a given clock cycle, multiplexers 661 through 667 pass delayed data associated with one sub-head. In non-interleaved mode, the delayed data passed by multiplexers 661 through 667 is associated with one sub-head over successive clock cycles. In interleaved mode, the delayed data passed by multiplexers 661 through 667 is associated with alternating sub-heads over successive clock cycles.

Multipliers 640 through 646 receive the outputs of multiplexers 661 through 667 along with weights 632 through 638. The multipliers 640 through 646 generate weighted pixel data, which is transmitted to summation unit 648. The summation unit adds the weighted pixel data to produce a weighted sum value over the weighted pixel data. The weighted sum value is transmitted from the horizontal scaling filter 600 as output pixel data 690. When operating in non-interleaved mode, the output pixel data 690 is associated with one sub-head. When operating in interleaved mode, the output pixel data 690 includes data associated with alternating sub-heads. For example, the first data element transmitted as output pixel data 690 may be associated with the first sub-head, and the second data element transmitted as output pixel data 690 may be associated with the second sub-head, and so forth.

In sum, a system is presented for generating multiple video output signals, which may be horizontally scaled, from a single video pipeline within a graphics processing unit. Pixels are interleaved from multiple video sub-heads before being transmitted to the video pipeline for processing. Horizontal scaling is performed by a horizontal scaling filter within the video pipeline. The horizontal scaling filter includes delay elements configured to preserve the sub-head association of the interleaved pixels entering and exiting the horizontal scaling filter.

A cross bar transmits the processed pixel data to video output encoders, which may receive a combination of pixels generated by the video pipeline. Each video output encoder selects which pixels should be transmitted to the respective display device, while discarding pixels destined to different display devices. By multiplexing the use of video pipeline resources to process pixels for multiple heads, greater overall efficiency is achieved within the host GPU. In particular, a single GPU with two independent video pipelines may be configured to support four display devices with negligible additional cost.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

We claim:

1. A horizontal scaling filter included in a video pipeline configured to process video data, the horizontal scaling filter comprising:
   a first set of storage elements, wherein each storage element is configured to receive pixel data in a first clock cycle and to transmit the pixel data in a second clock cycle to produce delayed pixel data;
   a second set of storage elements interleaved with the first set of storage elements such that a first storage element in the second set of storage elements is coupled to an output of a first storage element in the first set of storage elements and an input of a second storage element in the first set of storage elements, a last storage element in the second set of storage elements is coupled to the output of a last storage element in the first set of storage elements, and every other storage element in the second set of storage elements is coupled to an output of a different one of the storage elements in the first set of storage elements and an input of a subsequent storage element in the first set of storage elements, wherein each storage element in the second set of storage elements is configured to receive pixel data in the first clock cycle and to transmit the pixel data in the second clock cycle;
   a plurality of multipliers configured to generate weighted pixel data from the delayed pixel data; and
   a summation unit configured to sum the weighted pixel data to produce output pixel data.

2. The horizontal scaling filter of claim 1, wherein each multiplier in the plurality of multipliers is coupled to an associated storage element in the second set of storage elements and configured to receive pixel data transmitted by the associated storage element in the second clock cycle.

3. The horizontal scaling filter of claim 2, wherein the pixel data received by the storage elements is interleaved pixel data such that, in the first clock cycle, the storage elements in the first set of storage elements receive pixel data associated with a first sub-head and the storage elements, and the storage elements in the second set of storage elements receive pixel data associated with a second sub-head.

4. The horizontal scaling filter of claim 3, wherein, in the second clock cycle, the storage elements in the first set of storage elements receive pixel data associated with the second sub-head, and the storage elements in the first set of storage elements receive pixel data associated with the first sub-head.

5. The horizontal scaling filter of claim 1, further comprising a plurality of multiplexers, wherein each multiplexer is coupled to the output of one of the storage elements in the first set of storage elements and the output of one of the storage elements in the second set of storage elements and to the input of a subsequent storage element in the first set of storage elements.

6. The horizontal scaling filter of claim 5, further comprising a mode signal that indicates whether the pixel data received by the storage elements is non-interleaved or interleaved.

7. The horizontal scaling filter of claim 6, wherein the mode signal indicates that the pixel data received by the storage elements is non-interleaved, and the multiplexers are configured such that pixel data is passed directly from one storage element in the first set of storage elements to a subsequent storage elements in the first set of storage elements.

8. The horizontal scaling filter of claim 7, wherein the mode signal indicates that the pixel data received by the storage elements is interleaved, and the multiplexers are configured such that pixel data is passed from one storage element in the first set of storage elements to one storage element in the second set of storage elements to a subsequent storage element in the first set of storage elements.

9. A computing device, comprising:
   a memory; and
   a processing unit having a video pipeline that includes:
      a first set of storage elements, wherein each storage element is configured to receive pixel data in a first clock cycle and to transmit the pixel data in a second clock cycle to produce delayed pixel data,
      a second set of storage elements interleaved with the first set of storage elements such that a first storage element in the second set of storage elements is coupled to an output of a first storage element in the first set of storage elements and an input of a second storage element in the first set of storage elements, a last storage element in the second set of storage elements is coupled to the output of a last storage element in the first set of storage elements, and every other storage element in the second set of storage elements is coupled to an output of a different one of the storage elements in the first set of storage elements and an input of a subsequent storage element in the first set of storage elements, wherein each storage element in the second set of storage elements is configured to receive pixel data in the first clock cycle and to transmit the pixel data in the second clock cycle, a plurality of multipliers configured to generate weighted pixel data from the delayed pixel data, and a summation unit configured to sum the weighted pixel data to produce output pixel data.

10. The computing device of claim 9, wherein each multiplier in the plurality of multipliers is coupled to an associated storage element in the second set of storage elements and configured to receive pixel data transmitted by the associated storage element in the second clock cycle.

11. The computing device of claim 10, wherein the pixel data received by the storage elements is interleaved pixel data such that, in the first clock cycle, the storage elements in the first set of storage elements receive pixel data associated with a first sub-head and the storage elements, and the storage elements in the second set of storage elements receive pixel data associated with a second sub-head, and, in the second clock cycle, the storage elements in the first set of storage elements receive pixel data associated with the second sub-head, and the storage elements in the first set of storage elements receive pixel data associated with the first sub-head.

12. The computing device of claim 9, further comprising a plurality of multiplexers, wherein each multiplexer is coupled to the output of one of the storage elements in the first set of storage elements and the output of one of the storage elements in the second set of storage elements and to the input of a subsequent storage element in the first set of storage elements.

13. The computing device of claim 12, further comprising a mode signal indicating that the pixel data received by the storage elements is non-interleaved, and wherein the multiplexers are configured such that pixel data is passed directly from one storage element in the first set of storage elements to a subsequent storage elements in the first set of storage elements.

14. The computing device of claim 13, further comprising a mode signal indicating that the pixel data received by the storage elements is interleaved, and wherein the multiplexers are configured such that pixel data is passed from one storage element in the first set of storage elements to one storage element in the second set of storage elements to a subsequent storage element in the first set of storage elements.

* * * * *